United States Patent [19]

Videki, II

[11] Patent Number: 4,471,457
[45] Date of Patent: Sep. 11, 1984

[54] SUPERVISORY CONTROL OF PERIPHERAL SUBSYSTEMS

[75] Inventor: Edwin R. Videki, II, Tucson, Ariz.

[73] Assignee: International Business Machines Corporation, Armonk, N.Y.

[21] Appl. No.: 180,072

[22] Filed: Aug. 21, 1980

[51] Int. Cl.³ ............................................ G06F 13/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,303,476 | 2/1967 | Moyer et al. | 364/200 |
| 3,728,693 | 4/1973 | Macker et al. | 364/200 |
| 3,798,613 | 3/1974 | Edstrom et al. | 364/200 |
| 3,909,799 | 9/1975 | Recks et al. | 364/200 |
| 4,035,779 | 7/1977 | Birney et al. | 364/200 |
| 4,155,117 | 5/1979 | Mitchell | 364/200 |
| 4,319,323 | 3/1982 | Ermolovich et al. | 364/200 |
| 4,322,793 | 3/1982 | Andersson et al. | 364/200 |
| 4,396,984 | 2/1983 | Videki | 364/200 |

Primary Examiner—Gareth D. Shaw
Assistant Examiner—Tim A. Wiens
Attorney, Agent, or Firm—H. F. Somermeyer

[57] ABSTRACT

A peripheral subsystem accepts and responds to a plurality of supervisory channel commands which alter the operation of the subsystem; i.e., logically partition, break the logical partition, adjust or amend the logical partition, ignore the logical partition, give operator controls for loading and unloading a record cartridge, suspending multipath reconnection and the like. These supervisory commands can be located anywhere in a I/O chaining sequence. Some of the supervisory commands will result in changes in the subsystem operation for the duration of the instant channel program or CCW chain while others persist for as long as the subsystem is operating or until a subsequent supervisory command overrides the previous supervisory command. One of the supervisory commands can selectively inhibit subsequent supervisory commands only within a given I/O chain. This selective inhibit provides subsystem integrity. At the end of the chain, the inhibition is removed.

8 Claims, 6 Drawing Figures

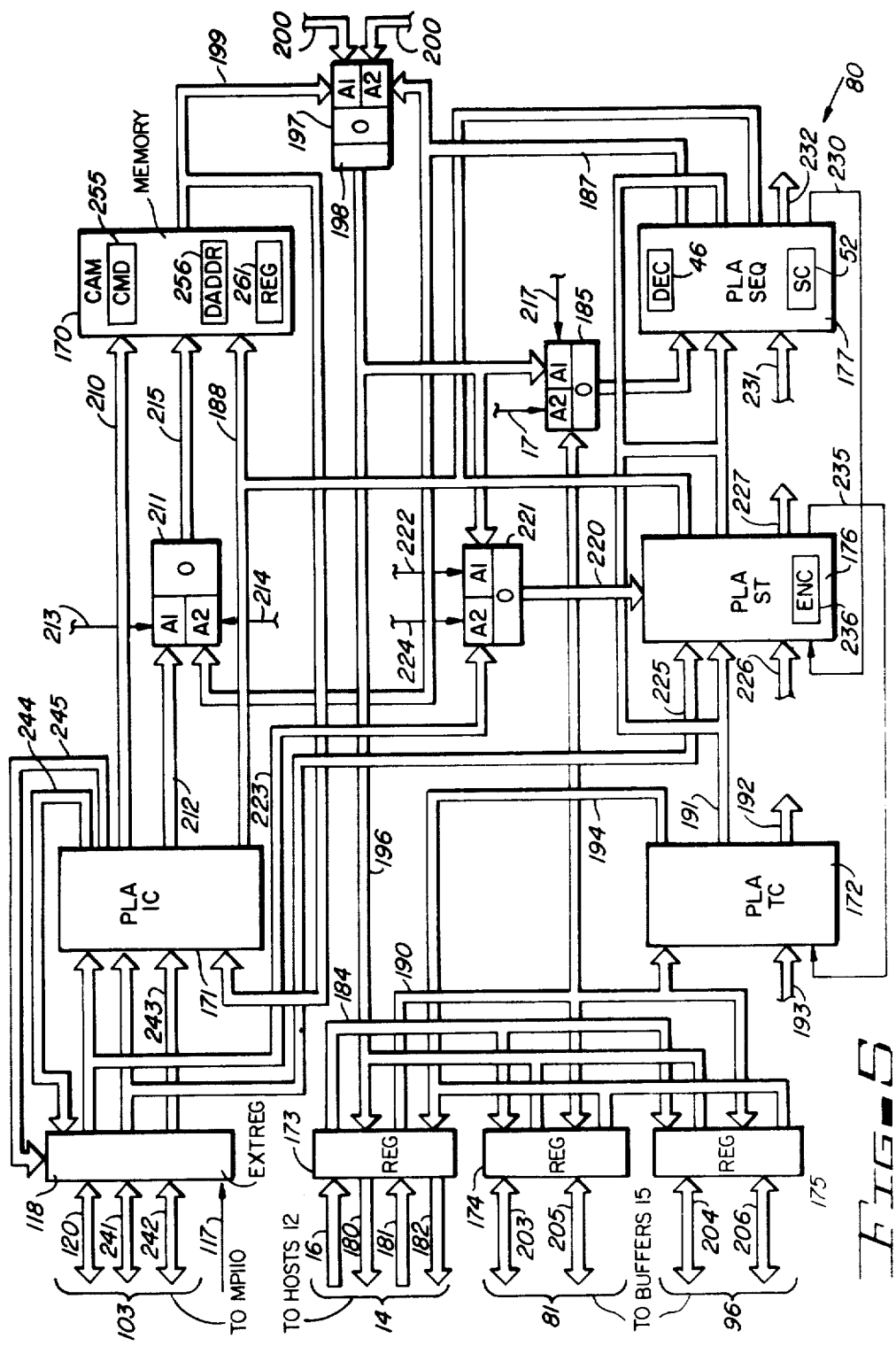

SUPERVISORY CONTROL OF PERIPHERAL SUBSYSTEMS

DOCUMENTS INCORPORATED BY REFERENCE

R. L. Cormier et al U.S. Pat. No. 3,688,274 shows a channel command retry (CCR), the practice of which creates a need for the present invention.

F. A. Luiz et al U.S. Pat. No. 4,207,609 shows a supervisory type channel command word referred to as a CCW.

G. M. Amdahl et al U.S. Pat. No. 3,400,371 shows a computer and a peripheral subsystem employing input-output channels (FIG. 41, et seq) operated with CCW's (FIG. 29) and using so-called chaining involved by a "SUPPRESS OUT" signal which is termed "SUPPRESS OUT" in the present description and described in Column 130 of this cited patent.

BACKGROUND OF THE INVENTION

The present invention relates to data processing, particularly to peripheral subsystems and the supervisory control of same as to logical configuration control, integrity of a subsystem, and data transfer supervision.

Communication between a data processor, often referred to as a host or central processing unit (CPU), and its peripheral subsystems is conducted via so-called input-output channels. The general configuration of such connections and operation is fully explained in U.S. Pat. No. 3,400,371. Included in U.S. Pat. No. 3,400,371, FIG. 41 and FIG. 50, is a showing of the input/output channel connections between a CPU and its attached peripheral subsystem. Control of a peripheral subsystem by the host or CPU is by the use of channel command words (CCWs) (which are shown in FIG. 29 of that patent). A series of CCW's within a host for a so-called channel program appears as a series of channel commands received by the peripheral subsystem. Such a series of commands is called a chain, which is indicated by a SUPPRESS-OUT signal applied by the host to the peripheral subsystem at the time STATUS-IN is supplied to the host from the peripheral subsystem. Such chaining identifies a unique series of commands related to a particular process or process portion of the host. During such chaining the peripheral subsystem or the host will normally not abort operations of the series of commands; either of course can break the chain upon certain predetermined conditions beyond the scope of the present description.

Each series of commands, hereinafter referred to as a "chain", has a close operational relationship. Different chains can perform different functions or series of functions between the host and the peripheral subsystem. The interaction between the host and peripheral subsystem in different chains can vary greatly. Such differences are instituted by the host sending a MODESET or SET FILE MASK as the first channel command related to a first CCW in a chain of such commands. Such MODESET or MODE CONTROL is currently limited to be the first command in a chain of commands. If there is any other significant change in operation, then the host constructs a new chain of CCW's to issue a second chain of corresponding channel commands. Typically a SET FILE MASK command is used with direct access storage devices (DASD) for indicating access restrictions in the chain of commands to the storage that is addressable via the input/output channel.

Other types of peripheral subsystems, such as magnetic tape recorders, employ MODE SET commands wherein the format of the signal to be recorded on the tape is specified in the first command of the chain, the mode of operation, whether it be write or read forward, as well as other operational characteristics.

Such MODE SET and SET FILE MASK commands are referred, as supervisory type commands in that, if a so-called nonprivileged user were to program such commands, overall data processing integrity in a given installation could be jeopardized. Accordingly, the restriction of a single supervisory command in a single chain has been used.

Examples of additional supervisory commands are found in U.S. Pat. No. 4,207,609. Such supervisory commands establish a multipathing control by establishing path groups, i.e., groups of input/output channels (paths). For example, establishing or altering such path groups is provided by a channel command move space called SHID; and additionally, sensing the logical configuration of such multipathed controls is provided by a sense command called SNID. Devices of a peripheral subsystem can be reversed and released to and from a channel path and to and from a host whether a single path (channel) is used or a path group is used. A device reserve (RESV) command and a device release (DREL) are supervisory commands employed for ensuring that a host has access to devices on an exclusive basis for a predetermined short period of time. Additionally, each peripheral subsystem usually has so-called buffered log, where unusual conditions, such as temporary errors and the like, are logged. When the capacity of the control unit buffered log is filled, interruption signals are supplied to the host. The host then supplies a read buffered log (RBLG) channel command to transfer the signal contents of such buffered log from the control unit to the host for analysis or additional logging. Such removal of error data can have an adverse effect on error recovery procedures, accordingly the read buffered log RBLG command is considered a supervisory command.

Typically a series of chains is required to effect one or more data processing operations that require interactions of the peripheral subsystem with the host. For example, a SNID supervisory command can appear in a first-occurring chain of commands. After that chain has set up the multipathing status of peripheral subsystem as set forth in U.S. Pat. No. 4,207,609, then a subsequent chain can start with a SET FILE MASK channel compound followed by the usual data processing commands, such as write, read and so forth. As peripheral subsystem complexities increase, the number of chains required to effect a data processing operation likewise increases. Also the purpose of limiting supervisory commands to be the first command in a chain for integrity checking and limiting error propagation becomes more important. That is, if a supervisory command occurred in the middle of a chain, and there was an error in that command, that error could be propagated and probably not be detected until sometime later. For this reason, close control of such supervisory commands is essential.

To handle supervisory commands in a series of chains requires substantial data processing operations in the host, i.e., each chain has to be started independently in a series of chains. This type of action also permits an intervening chain to use the peripheral subsystem to create a subsystem integrity exposure as to a desired data processing operation.

Accordingly, it is desired to enhance supervisory control of a host over a peripheral subsystem.

BRIEF DESCRIPTION OF THE INVENTION

In accordance with the present invention, a control for a peripheral device subsystem adapted to be attached to input/output channels of a host computer includes command means for receiving command signals generating operation control signals for distribution in the subsystem to effect execution of each command received over the input/output channel. Chaining means in the control unit are responsive to a signal (such as, SUPPRESS OUT) received from a connected host computer for indicating that a given sequence of input/output channel commands relates to a given data processing operation. Supervisory means in the subsystem respond to any one of a plurality of predetermined ones of the input/output command signals for generating supervisory control signals in response to predetermined ones of the command signals anywhere in a series of commands (chain); such supervisory signals may affect logical configuration of the subsystem, insertion or deletion of control characters in a text processing system, insertion or removal of record members, retrieval of sensitive error data, and the like. Further included in the subsystem are operation means responsive to the command means and to the supervisory means for responding to the operation control signals in accordance with the supervisory control signals, including certain ones of the supervisory control signals generated in a series of commands (chains) other than and preceding this one of said series of commands. Inhibit means are responsive to a one of the supervisory control signals received with or generated in accordance with a received command to inhibit response of the supervisory means to any subsequently received predetermined ones of said command signals for the remainder of instant series of commands. This inhibit prevents the subsystem from executing any such supervisory commands for preserving subsystem integrity. In a preferred form of the invention, the control for effecting the inhibit means is in an adaptor circuit of the subsystem which attaches directly to an input/output channel such that command propagation in the subsystem is extremely limited when the inhibit signal is active. Further control of the inhibition and acceptance of supervisory commands are placed in the subsystem under program control elements.

BRIEF DESCRIPTION OF THE DRAWING

FIG. 5 is a block diagram of a channel adapter in which the present invention can be advantageously employed with respect to the FIG. 1 illustrated data processing system.

FIG. 6 is a simplified showing of FIG. 5 channel adapters for more clearly pointing out the function of the invention within such a constructed channel adapter.

DETAILED DESCRIPTION

Figure 1:
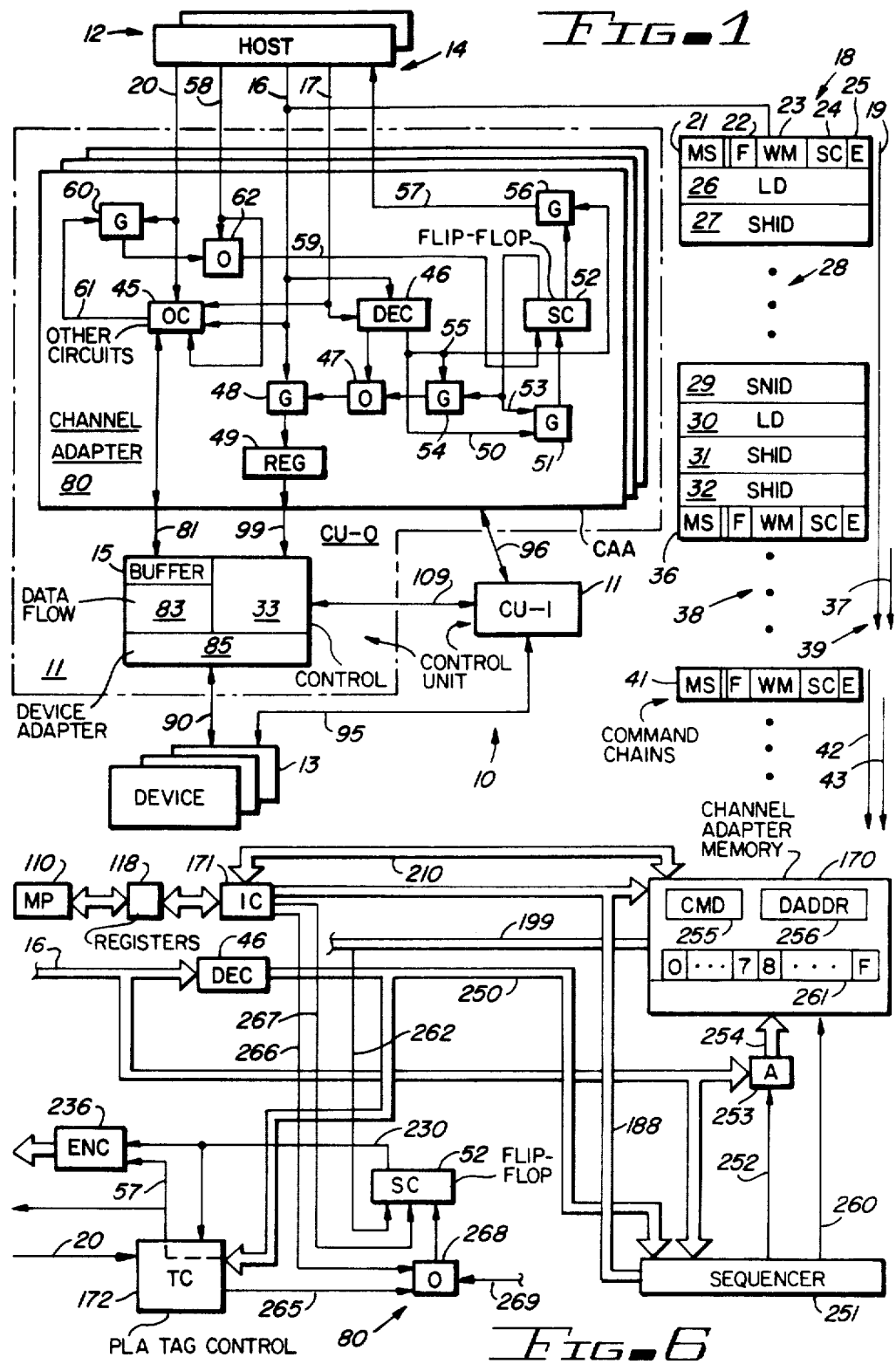
FIG. 1 is a logic diagram showing a data processing system employing the present invention with an example of a series of commands in which a method of the invention is employed and in which activation of inventive apparatus is illustrated.

Referring now more particularly to the drawing, like numbers indicate like parts and structural features in the various diagrams. A peripheral subsystem 10 includes a pair of control units CU-0 and CU-1, collectively enumerated 11. The control units 11 provide electrical switching and logical connections between a plurality of hosts 12 and a plurality of peripheral devices 13. Devices 13, in an exemplary implementation of the invention, are magnetic tape recorders. Hosts 12 are connected to control units 11 via a plurality of input/output channels, one of which is illustrated and denominated generally by numeral 14. Such input/output channels are preferably constructed using the teachings of cited U.S. Pat. No. 3,400,371, no limitation thereto intended.

The control units 11 are constructed identically, CU-0 being shown in some detail for enabling an understanding of the present invention. Each control unit 11 includes a data buffer 15, which is preferably a random access memory of the semiconductor type. Buffer 15 provides asynchronous coupling of data signals between hosts 12 and a selected device 13. Coupling buffer 15 to devices 13 are the usual data flow circuits 83 which includes data modulation circuits, demodulation circuits, and error detection and correction circuits. Data flow circuits 83 are coupled to a device 13 via one or more device adapters 85 and a similar interconnection indicated by double-headed arrow 90, all as described in said U.S. Pat. No. 3,400,371. Within each control unit 11, a programmed control 33 provides for supervisory and operational controls of buffer 15 and data flow circuits 83, device adapter 85 and the input/output channel adapters 80 (FIGS. 1 and 2), of which channel adapter CAA is detailed for illustrating a preferred implementation of the invention. In a preferred form of the invention, channel adapter CAA not only communicates with buffer 15 and control 33 in CU-0 via buses 81 and 99, respectively, but also with similar circuits in CU-1 via interconnection 96, herein shown as a double-headed arrow. That is, alternate pathing between a device 13 and a host 12 is provided by CU-0 and CU-1.

The flow of data command signals from host 12 to a channel adapter CAA is via channel bus out (CBO) 16 when channel COMMAND OUT (CCO) line 17 carries an active signal. Prefixing the channel command signals will be an address of a device 13, as indicated by a tag out line called ADDRESS OUT and as described in U.S. Pat. No. 3,400,371 but not shown in FIG. 1 for purposes of simplicity. The command signals received over CBO 16 are chained in a series of chains such as the chains referred to in the background of the invention, and as chain 18 is indicated by SUPPRESS OUT signal 19 occuring when STATUS IN (end of each command) is to be supplied from a control unit 11 to a host 12. SUPPRESS OUT line 20 extends from host 12 to channel adapter CAA as one of the tag lines of the interconnection described in U.S. Pat. No. 3,400,371.

Before describing channel adapter CAA, chain 18 is described for illustrating a first aspect of the present invention. In a preferred embodiment, the invention is practiced by inserting control signals within a so-called MODE SET (MS) input/output command, which in chain 18 is illustrated by numerals 21, 36, and 41. The constituents of a MODE SET command used in the illustrated embodiment are described with respect to MODE SET command 21, a first-received command in a first chain 18. MS 21 is one byte representing the command code portion itself. Fields 22-25 are in a MODE SET control byte which is appended to the actual host pattern of a MODE SET channel command code MS, all bytes being transmitted over CBO 16 in accordance with established protocol set forth in U.S. Pat. No. 3,400,371. The MODE SET command bit pattern on CBO 16 signifies that the next received byte of data over CBO 16 will be the byte 22-25. This byte includes a format (FMT) field 22 which defines the format of signals to be recorded on a magnetic tape record member being handled by the addressed one of the devices 13. For example, the format selected can be group coded recording (GCR) having a record density of 6250 bytes per lineal inch of magnetic tape record. Other formats, such as phase encoding and other special modulation codes and control formats also can be indicated by field 22. Field 23 indicates other operations, for example, whether or not the control unit is to be placed in the recording mode for recording signals on tape within a device 13, a readback mode, a test mode or the like. The third field SC 24 refers to a portion of the FIG. 1 illustration for practicing the present invention. When the SC 24 has a zero code, than no supervisory control is being exercised. Supervisory commands, as will be later described, can be inserted into the chain of commands 18 that are received following MODE SET command 21. On the other hand, when the SC 24 field has a predetermined pattern, such as all ones, than no more supervisory commands can be received during chain 18. Further control is employed, for example, alternate 1-0's indicate that the next three input/output commands following command 21 can be supervisory commands; then all commands beginning with the fourth command cannot be supervisory commands, including no more MODE SET commands. Such inhibitions and other selective control are inserted into channel adapter CAA, as will become apparent, and are memorized only for the duration of the chain, as indicated by SUPPRESS OUT signal 19. SC 24 in a preferred form is one bit yield permitted or inhibited supervisory commands. Field 25 is an error control field for preventing propagation of errors under certain circumstances and which is beyond the present description.

The description assumes that SC 24 is all zeros for permitting subsequent supervisory commands to be executed within chain 18. The next following command 26 is indicated as being a LOAD DISPLAY (LD) command. LD command 26 is a supervisory command directed toward an addressed one of devices 13 for indicating predetermined controls of a digital display (not shown) contained on a tape recorder. Such a display can have various functions for conveying messages to a tape recorder operator, the details of which are not necessary for an understanding of the invention; it is necessary to understand only that it is a supervisory type command. Following command 26, command SHID 27 occurs; this command corresponds to a CCW or input/output command described in U.S. Pat. No. 4,207,609. Following command 27, a plurality of commands indicated by ellipsis 28 are performed for ensuing data processing operations, all in accordance with U.S. Pat. No. 3,400,371. Following the commands indicated by ellipsis 28, sense command SNID 29 is supplied to the peripheral subsystem for an addressed device 13. SNID is described in U.S. Pat. No. 4,207,609. Next is LD 30, a second load display command. Following LD 30 are a pair of SHID commands 31, 32. Then at 36, a second MODE SET command is received with the SC field being equal to one for indicating that subsequent supervisory commands are to be inhibited until the end of the chain, as indicated by numeral 39. The SC inhibition is indicated by arrow 37, which shows inhibition beginning at the conclusion of MODE SET command 36. The inhibition arrow 37 remains until the end of the chain, at 39. All subsequent commands indicated by ellipsis 38, within the chain 18 indicated by SUPPRESS OUT 19, cannot be supervisory type commands; they must all be data processing related commands, as described in U.S. Pat. No. 3,400,371. Any received supervisory command at line 37 will be rejected and not performed by the peripheral subsystem.

From the above description, it can be seen that any plurality of supervisory commands for setting up a data processing operation can be resident in one chain with all other commands related to such data processing operation, as opposed to a plurality of successive independent chains of commands as heretofore required. This flexibility ensures that supervisory commands are never separated from data processing type commands in a series of chains of commands. This method provides for better data processing continuity, channel utilization and subsystem integrity.

In the event a supervisory command would be included in the commands indicated by ellipsis 38, channel adapter CAA would detect the receipt of such a supervisory command, compare it with the inhibition signal 37 and supply an error condition signal called UNIT CHECK (command reject) to host 12, indicating that it is improper procedure to supply a supervisory command following a MODE SET command having a SC inhibit indication.

Following point 39, the termination of command chan 18, the inhibit signal represented by arrow 37 is erased by channel adapter CAA. A new chain of commands indicated by SUPPRESS OUT arrow 42 can be started, as by a MODE SET command 41. MODE SET command 41 has an inhibit indication in its SC field which causes the inhibit supervisory command signal 43 to be present in channel CAA immediately. Upon termination of channel command 41, the SC inhibition is in effect for the entire chain 42; when a chain includes no MODE SET commands, no supervisory inhibit occurs during that chain.

Channel adapter CAA, as well as the other channel adapters 80, are constructed similarly to the channel adapter shown in the U.S. Pat. No. 3,400,371 illustrated control unit. Most of the tag sequence circuits shown in U.S. Pat. No. 3,400,371, as well as transfer circuits of such channel adapters, are represented by other circuits OC 45. CAA includes decoder DEC 46 which is connected to CBO 16 and is activated to decode the received signals from CBO 16 as a channel command when activated by the COMMAND OUT CCO signal received over line 17. Decoder 46 decodes the CBO 16 signals and supplies an activating signal through OR circuit 47 to gate circuits 48 for transmitting CBO 16 signals to register 49. Decoder 46 also transfers commands, such as read from tape, write to tape and so forth, to control 33 via register 49 and interconnection 99 for execution using known data processing techniques which are not pertinent to an understanding of the present invention. CBO 16 is also connected to OC 45 for transmitting data signals to be recorded on tape (not shown) of device 13 via connection 81, buffer 15, data flow circuits 83 and connection 90.

For minimizing channel time in responding to host 12 supplied requests, it is preferred that CAA decode and provide many of the control unit 11 functions. Supervisory control is one of these operations. In this regard, decoder 46 also decodes the control byte 22–25 and supplies an activating signal over line 50 to activate gate 51 for selectively setting SC flip flop 52 to the active condition. SC flip flop 52 indicates to channel adapter CAA that no more supervisory commands are to be received during the instant chain. Gate 51 is activated in response to the line 50 signal corresponding to the SC field 24 and the line 53 signal received from the reset output of SC flip flop 52. Gate 54, which is an electrical AND circuit, responds to SC flip flop 52 being reset and to a received decoded signal on line 55 from decoder 46 indicating that a supervisory command has been decoded to supply an activating signal through OR circuit 47 for activating gates 48 to pass a received command to register 49.

The control in CAA for inhibiting supervisory commands is described. When SC flip flop 52 is set, gate 54 is disabled, therefore no supervisory command signals are transferred through gate 48. This control prevents transfer of received supervisory command signals to control 33. This action prevents the subsystem from executing the received and to-be rejected commands. The above described UNIT CHECK signal is supplied by gate 56 responding to SC flip flop 52 being set and a decoded supervisory command signal on line 55. The UNIT CHECK (command reject) signal goes over line 57 through I/O interface 14 to host 12.

From the above description, it is seen that circuits of CAA activate SC flip flop 52 to be effective on the next received command signal over CBO 16 as indicated by CCO on line 17. The above description assumes that not only are the commands bits of the command byte of a channel command transmitted through decoder 46, but also bits of the byte 22–25 which is decoded using known decoder techniques.

Termination of inhibit supervisory commands is next described. It will be remembered that line 20 of channel connection 14 is the SUPPRESS OUT line which goes to OC 45. Line 20 is also connected to gate circuit 60, which is activated by OC 45 via a signal on line 61 for indicating status end is occurring. Gate 60 is constructed such that when SUPPRESS OUT signal on line 20 is inactive and there is an active signal on line 61, an active signal is supplied through OR circuit 62 over line 59 for resetting SC flip flop 52. This action corresponds to the termination of the inhibit signal 37 at the end of the chain 18 at 39. Host 12 can also reset inhibit signal 37 at anytime during the chain by terminating all chained operations. This reset is achieved by supplying a SYSTEM RESET signal over line 58 through OR circuit 62, which also resets SC flip flop 52. Line 58 is also connected to OC 45 such that the entire peripheral subsystem is reset to reference state by the line 58 signal.

Other connections of peripheral subsystem 10 include interconnection 95 extending from CU-1 to devices 13 and connection 109 extending between the two control units 11 for providing control-unit-to-control-unit communication as indicated later with respect to FIG. 2. It is to be understood that other functions and connections may be provided in a practical constructed embodiment of peripheral subsystem which implements the present invention.

Figure 2:
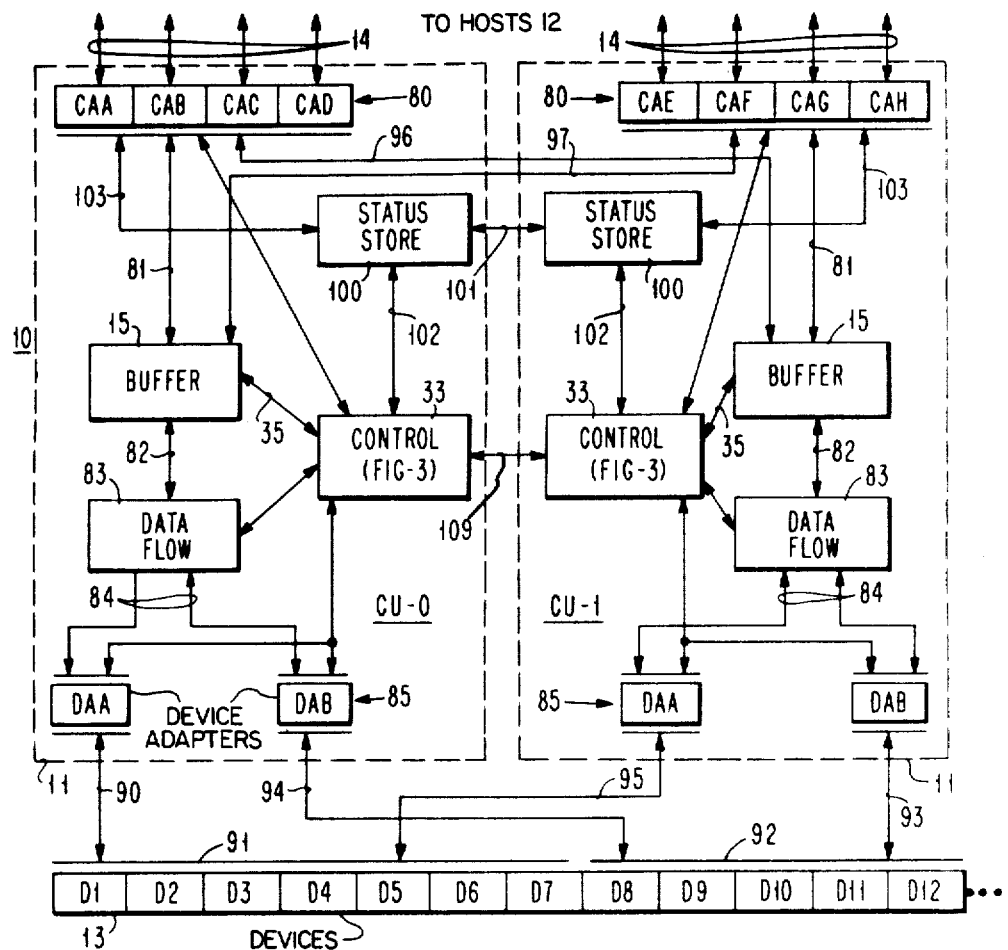
FIG. 2 is a block diagram of a two control unit data processing subsystem which may advantageously employ the present invention.
Figure 3:
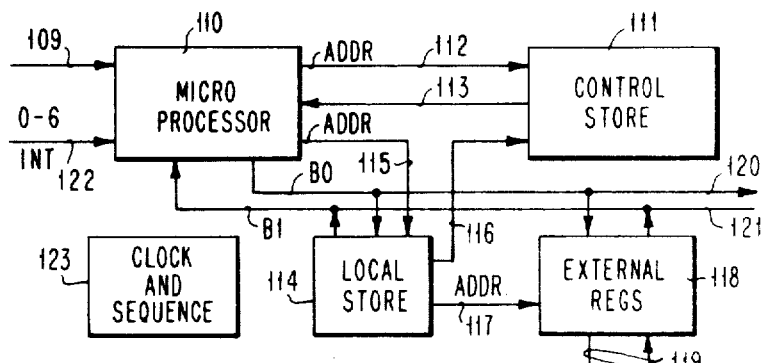
FIG. 3 is a logic diagram showing the control portion of the FIG. 2 illustrated subsystem.
Figure 4:
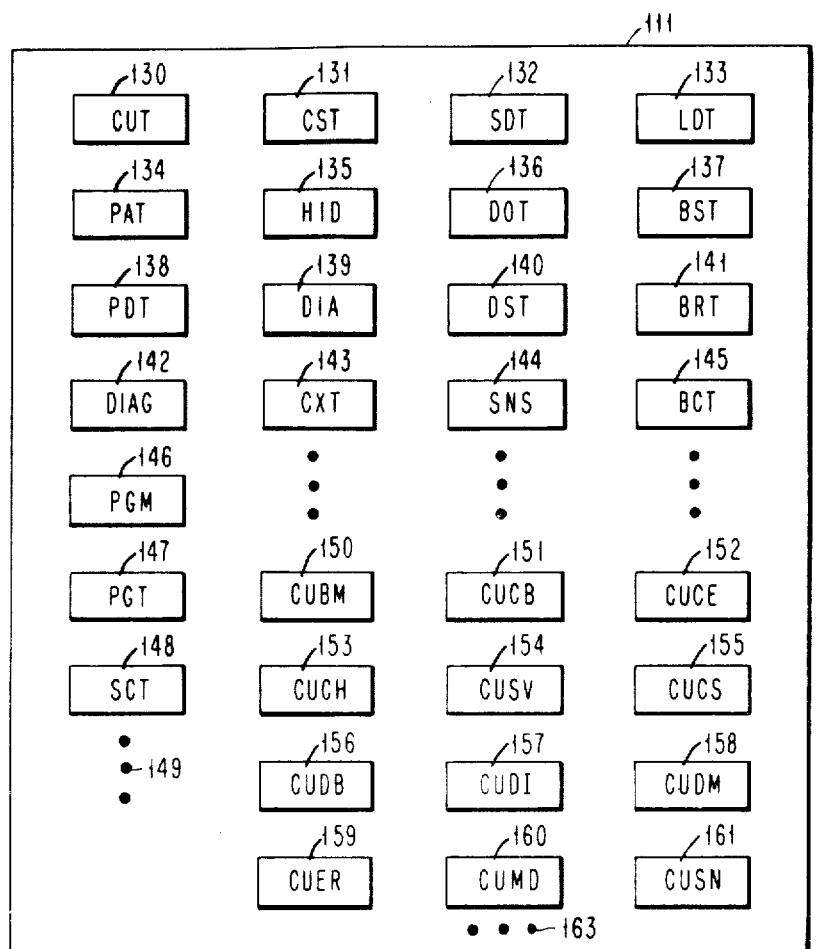
FIG. 4 is a memory map of the control memory of the FIG. 3 illustrated control.

Before further describing the invention, the environment in which the invention preferably resides is described with particular reference to FIGS. 2–4, which illustrate a storage subsystem employing reel-to-reel tape drives denominated as devices 13 D1–D12. The preferred arrangement includes two control units 11 denominated as CU-0 and CU-1. The arrangement is such that any of the devices can be connected to the host 12 via input/output channel interface 14 through either of the control units, CU-0 or CU-1. The attachment to a host 12 by each of the control units 11 is via a plurality of channel adapter circuits 80 which are individually denominated CAA-CAH. Each of the channel adapters 80 can communicate directly with a buffer 15 in either control unit 11. Both CU-0 and CU-1 are identically constructed. Accordingly, like numerals are indicating like parts in the two control units, with the interconnections between the control units being separately denominated. Channel adapters CAA-CAD are in CU-0 while CAE-CAH are in CU-1. The respective channel adapters communicate with a buffer 15 in its own control unit via cable 81. Communications from the buffers to the devices 13 are over cable 82 through a data flow circuit 83, thence to cable 84 through a plurality of device adapter circuits 85. The device adapter circuits are separately denominated by characters DAA through DAB in both control units 11. Data flow circuits 83 contain recording circuits. The programmed control 33 is electrically connected to all of the described portions of the respective control units 11, and operates generally in a known manner for storage subsystems as generally shown in Irwin U.S. Pat. No. 3,654,617, filed in U.S.A. Oct. 1, 1970, application Ser. No. 77,088. The interconnections between the control units 11 and the devices 13 are on a primary/secondary basis. Devices D1–D8 are primary to CU-0 and secondary to CU-1. In a similar vein, devices D9–D16 (D13–D16 not shown) are primary to CU-1 and secondary to CU-0. The significance of primary and secondary connections relates to which of the control units CU-0 or CU-1 maintains status for the respective devices; i.e., the control unit CU-0 maintains status information for D1–D8 while CU-1 primarily maintains status information for D9–D16. As will become apparent, both control units CU-0 and CU-1 memorize status indications for all of the devices 13. In the primary connections, adapters DAA-DAB of CU-0 are connected via a cable 90 to all of the devices D1–D8. In a similar manner, the connection to D9–D16 to CU-1 is via cable 93 through adapters DAA-DAB. The secondary connection from CU-0 to devices D9–D16 is via cable 94 while CU-1 is connected to devices D1–D8 via cable 95. The operations between the device adapters 85 and the various devices D1–D16 include tag control lines and bus data transfer lines which enable the control units 11 to closely control and operate devices 13.

In prior tape subsystems, the data flow paths were not fully mutipathed in that the channel adapters 80 communicated only with the data flow circuits 83 in its respective control unit 11. In the preferred configuration, any of the channel adapters CAA-CAH can communicate with any of the devices 13 through either data flow circuit 83. The internal control unit 11 connection from channel adapters CAA through CAD and adapter CAA-CAD of CU-0 and from channel adapters CA- E-CAH of CU-1 are as previously described. Connections from channel adapters CAA-CAD to the buffer 15 of CU-1 are via cable 96, whereas each channel adapter CAE-CAH connects to the buffer 15 of CU-0 via cable 97. Accordingly, either data flow circuit 83 or buffer 15 can communicate with any of the hosts via any of the channel adapters. This arrangement, of course, requires close coordination between control units 11.

The total subsystem status is maintained in each of the control units 11 via a pair of status stores 100. Status stores 100 communicate with each other via a cable 101 independent of data processing operations; that is, as soon as CU-0 changes status, such as by selecting a device 13, the status store 100 in CU-0 immediately communicates to status store 100 in CU-1. Similarly, any cross-connection between the channel adapters 80 and the buffers 15 is immediately indicated in both status stores 100. Each of the status stores 100 contains a plurality of registers for containing bits relating to device status, buffer status, channel status and the like. Such status information reflects the selection status of the device, its busy status, contingent connections and all other status necessary for operating the storage subsystem with the input/output interface 14.

One and only one control unit 11 can change the configuration of the storage system at a given time. In this regard, cables 102 extend from the respective status store 100 to control 33. When control 33 of CU-0 wants to change logical configuration of the subsystem by selecting a device 13, for example, control 33 communicates with its status store 100 and requests permission to change subsystem status. Status store 100 is in an appropriate master state and permits control 33 to make a selection. Otherwise, status store 100 of CU-0 requests the status store 100 of CU-1 to give it the master state. Whichever control unit 11 has the master state is the only one which can change logical configuration of the subsystem, the master state being shifted between the control units as configuration changes dictate. Status stores 100 also communicate with the respective channel adapters in the control units 11 via cables 103. Such communication includes the supplying of device busy status to the channel adapters from the status stores and the request for selection from the channel adapters to the status stores; that is, if CAB 80 wants to select device D6 on behalf of a host request, CAB 80 communicates with its status store 100 of CU-0 requesting that the device D6 be selected. Status store 100 will supply the busy or not busy status of D6 to CAB. CAB then immediately responds to the host request with respect to device D6, thereby reducing selection and inquiry time between a host 12 and control units 11.

Control 33 can take different configurations. The configuration preferred for use in connection with the FIG. 2 illustrated storage subsystem is shown in FIG. 3. A programmed microprocessor 110 operates in accordance with microcode program stored in control store 111. Such microprograms enable microprocessor 110 to completely manage buffer 15, to provide supervised data flow circuit 83, to communicate with status store 100, and to supervise and enable selection of the channel adapters 80 and device adapters 85. Further communication between controls 33 in the two control units 11 on a processor-to-processor basis is via cable 109 using known interprocessor communications techniques. Using known techniques, microprocessor 110 selects the microprograms of control store 111 via address bus 112. Control data are supplied from the control store 11, including microprogram instruction words, via bus 113. Of course, the usual idle scan loop for operating microprocessor 110 is resident in control store 111. Additionally, control 33 includes local store 114 which acts as a working control store for microprocessor 110. The addressable registers of local store 114 are addressed via bus 115. Bus 116 transfers signals from local store 114 to control store 111 under control of microprocessor 110; that is, it is preferred that the data stored in control store 111 from microprocessor 110 be transferred via local store 114. Communications between control 33 and all of the items shown in the control units 11 are via sets of external registers 118, which are addressed by address signals supplied over bus 117 from local store 114, no limitation thereto intended. Communications from external registers 118 to the various elements of the control units 11 are via a pair of unidirectional buses 119, which are electrical connections made in the usual manner.

Microprocessor 110 includes the bus out BO 120 and a bus in BI 121 which are connected to local store 114, external registers 118 and other units as may be desired. Microprocessor 110 is interrupt-driven through a plurality of interrupt levels. These interrupts are supplied by the various elements of the control unit 11 over bus 122 which carries interrupt signals having levels 0 through 6, the priority of which is preassigned in accordance with the functions to be performed in the storage subsystem. The electrical signal timing of control units 11 is by clock and sequencer 123. Not only does clock and sequencer 123 provide timing pulses, it also sequences microprocessor 110 for initializing control 33 to properly operate the control unit 11. The connections 119 from external registers 118 are to all the other portions of control unit 11.

FIG. 4 is a map of control store 111 showing control tables and microprogram groups. The tables, of course, contain those signals representing control information necessary for the successful operation of the storage subsystem. First the tables are described.

CUT 130 is a so-called control unit operation table which contains information-bearing signals pertaining to the entire control unit 11. This table relates to the operational status of the individual control unit CU-0 and CU-1 and is not device 13 nor channel 14 related. CST 131 is a command status table which contains information-bearing signals describing the current command status which is being executed for an addressed device 13; that is, host 12 supplies channel commands over I/O interface 14 to the respective control units 11. CST 131 reflects the present status of the execution of those commands received by any of the channel adapters 80. SDT 132 contains information-bearing signals signifying the status of a selected device 13. This table enables the control units 11 to closely control and operate any of the devices 13. LDT 133 is a so-called logical device table which contains information-bearing signals signifying the status of each of the devices 13 as those devices are logically extended into the buffer 15 and the broad operational status of the respective devices, which status information is more general in character than that appearing in SDT 132. PAT 134 is pending allocation table having information-bearing signals which queue devices 13 by their respective addresses which require buffer space when buffer space has not yet been allocated. The table is preferably a FIFO (first in, first out) table of the circular type. HID 135 is a table containing host identification signals for the hosts 12 communicating with the control units 11 via channel adapters 80. DOT 136 relates to device operations and contains information-bearing signals signifying schedule, active and completed device 13 operations. Such operations include tape transport, reading and writing and the like. BST 137 contains information-bearing signals relating to the status of the buffer 15. Such information-bearing signals relate to data transfers into and out of the buffer, allocation of buffer space and other buffer related functions. PDT 138 contains information-bearing signals signifying the buffer space of the buffer 15 which can be deallocated from devices 13 as soon as the activity with respect to such buffer space ceases. Deallocation does not occur until such activity stops. DIA 139 contains information-bearing signals signifying device information; control data relating to devices 13 and concerned with input/output interface 14 as well as intercontrol unit communication over cable 109 are stored here. Such information may originate because of device 13 operations as well as interface 14 operations. DST 140 stores information-bearing signals relating to device status; that is, the last device status presented by the device 13 to control units 11 is stored in this area. BRT 141 relates to the operation of buffer 15. This table identifies the status of records in the buffer 15. Each record in the buffer will be entered into BRT 141 and may contain characterizing signals showing the status of the record with respect to its storage in buffer 15.

DIAG 142 is a table used to control diagnostic functions executed in the control unit 11. CXT 143 contains information-bearing signals relating to transfer of signals between buffer 15 and any of the I/O interfaces 14 via the channel adapters 80. Such information includes direction of transfer and the address of the device 13 related to such transfer. SNS 144 holds information-bearing signals representing sense data to be reported to a host 12, as well as a so-called buffered log arranged by device 13 addresses. BCT 145 stores information-bearing signals relating to the dynamic logical address configuration of buffer 15. Such configuration will vary in accordance with the number of devices 13 connected to the control units, as well as whether there is one control unit 11 or two. PGM 146 is a so-called path group map which indicates which devices 13 may be logically connected to channel adapters 80 for logically partitioning the subsystem into one or more logical storage units. Path group table PGT 147 complements PGM 146 in that it includes identification signals identifying the logical partition and which of the channel adapters 80 is resident within each of the logical partitions. SCT 148 is a table containing signals relating to the idle scan for determining if any activity is to occur with respect to a given device 13. A diversity of actions can be instituted via SCT 148.

Numeral 149 indicates other tables not specifically referred to herein but that could be found in a constructed embodiment of the FIG. 2 illustrated storage subsystem. Such entry may include indications identifying the free space of buffer 15, priority queues for space of buffer 15, a segmentation indication for buffer 15, tracing status, timer tables for controlling time-outs and other miscellaneous areas necessary or desirable for constructing a multiple device storage subsystem.

Various program groups include CUBM 150, which are the microcode programs relating to the management of buffer 15. CUCB 151 identifies those microcode programs relating to the transfer of signals between an I/O interface 14 and buffer 15 via channel adapters 80. CUCE 152 relates to setting up the tables described above in preparation for executing a command received from a host 12 over input/output interface 14. CUCH 153 relates to the channel control aspects, such as device selection and the like. CUSV 154 relates to an interrupt supervisor as it uses scan vectors in determining priority of the interrupts. CUCS 155 is a command support set of microcode which executes the commands set up by CUCE 152. CUDB 156 relates to the control and supervision of signal transfers between devices 13 and buffer 15. CUDI 157 relates to the control of the device adapters 85. CUDM 158 relates to the management of devices 13 such as scheduling their operations, etc. CUER 159 relates to error detection and recovery microcode. CUMD 160 relates to diagnostic procedures executed by a control unit 11. CUSN 161 relates to handling sense data such as stores in SNS 144. Numeral 163 indicates that the above program groupings may be modified and extended as the need arises for a storage subsystem.

FIG. 5 illustrates a constructed version of a channel adapter CAA 80 which incorporates a teaching of the present invention. FIG. 6, later described, is a simplified version of FIG. 5, which more clearly illustrates how the invention was incorporated into a channel adapter. The major components of the FIG. 5 illustrated channel adapter include a channel adapter memory CAM 170 and a plurality of programmable logic array (PLAs). A first PLA 171 provides for internal communication (IC), such as communication with microprocessor 110 via connection 103 and the major components of CAA 80. The second PLA 172 is a tag control (TC) PLA which provides tag synchronization in accordance with U.S. Pat. No. 3,400,371 with input/output interface 14 and also communicates with interconnections 81 and 96 which are internal to control unit 11. Communications with various elements of control unit 11 from CAA 80 are via the external register 118 to MP 110, register 173 which statically stores signals received from and supplied to input/output interface 14, and exchange registers 174, 175 which provide a buffer function with respect to interconnections 81 and 96. The last two PLAs, 176 and 177 respectively, are for generating status signals (ST), such as supplied during status in time of U.S. Pat. No. 3,400,371, and for internal sequencing (SEQ) of CAA 80.

The primary function of CAA 80 is to provide communications with a host 12 via input/output interface 14, which includes receiving signals via CBO 16, supplying signals over channel bus in (CBI) 180, and exchanging tag or control signals respectively over channel tag out (CTO) 181 and channel tag in (CTI) 182 cables via register 173. Internal CBO 184 is a logical continuation of CBO 16, extending it to buffer registers 174, 175 and to PLA 177 via AND-OR (AO) circuits 185. PLA 177 is constructed to include the circuit components of decoder 46 as explained with respect to FIG. 1. The A2 input portion of AO 185 is gated by the CCO signal received over line 17 which is a part of CTO 181. PLA 177 further includes SC flip flop 52. PLA 177 supplies data output signals (such as the operation control signals, decoded supervisory command signals and the like) over cable 187 for storage in CAM 170 and for transmittal to other portions of control unit 11 via registers 174, 175, and supplies certain control data signals to host 12 via input/output interface 14. Cable 188 carries address signals for accessing registers within CAM 170. These address signals are generated in PLA 177, PLA 176, or transmitted via PLA 171 as received from microprocessor 110.

CTO 181 is logically connected to an internal CTO bus 190, which extends to registers 174, 175 for exchanging tag control signals with the respective data flow circuits 83 of the two control units 11 and to PLA 172 for synchronization of CAA 80 with host 12 tag signals during selection/deselection and status reporting time. It is a usual procedure for a channel adapter 80 to provide tag synchronization with the host 12 during these times, while the data flow circuits 83 and other automatic circuits provide a tag sequencing such as SERVICE IN, SERVICE OUT during data transfer times without involving the channel adapter 80 control circuits. PLA 172 provides tag-derived sequencing and control signals and supplies same over cable 191 to PLA 176 for sending status signals to input/output interface 14. Additionally, it should be understood that, because of the complex functions of CAA 80, PLA 172 also has additional inputs not pertinent to an understanding of the present invention, as indicated by truncated arrow 193 with additional outputs indicated by arrow 192. Similar to the internal CTO 190, CAA 80 has an internal CTI 194 which is connected logically to CTI 182. Registers 174, 175 are connected to internal bus 194 for supplying internal CTI signals from the respective data flow circuits 83 of control units 11.

Bus 196 extending from AO 198 is the internal CBI which is logically connected to CBI 180. Registers 174, 175 also provide signals to internal CBI 196. AO 197 has register 198 for statusizing its output for supplying electrical signals to internal CBI 196. AO 197 receives data signals, which can be control data signals, over cable 199 from CAM 170 via A-1 input portion. In a similar manner the A-2 input portion receives similar signals from PLA 177. Control of AD 197 is via inputs 200 which are derived from tag signals via PLA 172, derived from microprocessor 110 via PLA 177, all in a timed sequence enabling CAA to accomplish the procedures set forth in U.S. Pat. No. 3,400,371.

Registers 174, 175, which connect respectively to the data flow circuits 83 of the control units CU-0 and CU-1, have bidirectional buses 203 and 204, respectively, which are timed and sequenced by tag control signals on bidirectional tag lines 205 and 206. All sequencing is generally in accordance with the teaching of U.S. Pat. No. 3,400,371 and as otherwise well-known in the data processing art.

The input and output connections of CAM 170 include a data bus 210 extending from PLA 171, which is a logical extension of microprocessor 110 buses 120, 121 using external register 118. Other data inputs to CAM 170 are from AO circuits 211, which receive data signals from PLA 171 via A1 input portion as controlled by signals received over line 213, also from PLA 171. Additionally, the A2 input portion gates the signals from bus 187, which carries the signals generated by PLA 177 as gated by the control signals on line 214 from PLA 177. The output signals of AO 211 go over bus 215 to CAM 170. The output signals of CAM 170 are carried over bus 199 to previously described AO circuits 198. Bus 199 also extends to PLA 171 such that its output signals can be relayed to microprocessor 110 via external register 118. Bus 199 also extends to previously described AO circuits 185, wherein the A1 input portion gates bus 199 signals under control of a signal on line 217 received from PLA 177.

For status generation, PLA 176 receives input signals over bus 220 from AO circuit 221. The A1 input portion of AO 221 is controlled by signals on line 222 received from PLA 177 for gating the signals on bus 199 to PLA 176. Additionally, the A2 input portion is gated on by the signals on line 224 received from PLA 177 to gate the signals on bus 223 carried from external register 118. The purpose of this connection is to transfer microprocessor 110 generated status signals to PLA 176. Additionally PLA 176 receives signals over bus 225 from external register 118 which are ordered and controlled by microprocessor 110 and not subject to selective gating by PLA 177. PLA 176, in order to provide all of the interfacing and control status-related functions of CAA 80, requires connections not pertinent to an understanding of the general operation of CAA 80 for the present invention; these additional functions are indicated by the two arrows 226 and 227 respectively indicating additional inputs and outputs of PLA 176.

PLA 177 is the sequence control for CAA 80. It includes SC flip flop 52, which has its output line 230 extending from PLA 177 to the input of PLA 176. PLA 176 notes the state of SC flip flop 52 for generating UNIT CHECK status via encoder 236, which is embodied in PLA 176. Additionally, PLA 176 supplies channel command retry (CCR) signals over line 235 to PLA 172 for relaying to input/output interface 14. Returning to PLA 177, it will be appreciated that, with all of the complicated elements of CAA 80, sequencing PLAs will have a multitude of connections, many of which are not necessary to an understanding of the general arrangement or the present invention. Accordingly arrows 231, 232 respectively indicate additional inputs and outputs of sequence control PLA 177.

PLA 171 has a multitude of connections to microprocessor 110 as indicated by numeral 103; included are address signals exchanged over bus 241 and a clock control set of lines in bus 242, which are beyond the scope of the present description. External register select line 117 extends from local store 114 of FIG. 3 for selecting external register 118 to gate the signals flowing between microprocessor 110 and CAA 80. The signals of clock bus 242 are logically extended to internal bus 243, which forms an input to PLA 171. Additional connections to external register 118 are via buses 244, 245 which respectively carry REQUEST IN signals as well as data signals to microprocessor 110. In other words, PLA 171 relays signals read from CAM 170 as requested by microprocessor 110 through external register 118.

Shown in CAM 170 are registers used in connection with practicing the present invention. For example, CMD 255 stores the bit pattern received over input/output interface 14 which constitutes the command byte of an input/output command. DADDR register 256 stores the device address immediately preceding the command signals stored in register 255 and identifies which device 13 is being addressed by host 12. Additionally, register 261 is the register storing each of the SC flip flop 52 inhibit signals for all of the devices 13, as will become more clear with respect to FIG. 6. A received MODE SET command can set SC flip flop 52, and simultaneously PLA 177 will transfer that setting bit signal to an assigned bit position of register 261. In this manner, as the plurality of devices 13 are addressed during respective chains and with the chains being interrupted by channel command retry in accordance with U.S. Pat. No. 3,688,274, CAM 170 memorizes the supervisory control inhibit for all chains that may be interleaving through CAA 80 in a multipathing environment, such as set forth in U.S. Pat. No. 4,207,609 and as enabled by CCR's set forth in U.S. Pat. No. 3,688,274. Each SC inhibit signal must be transmitted to all members of the path group; this is done via status store 100 of the control unit, which then sets each of the registers 261 for showing the current supervisory control status for inhibiting supervisory commands in a given chain of commands which may be multipathed via a plurality of channel adapters. Broadcasting and transferring of such control signals between various programmed units is a well known procedure and therefore not detailed in the present description.

FIG. 6 is a simplified showing of a channel adapter CAA 80 for illustrating the operation of the invention. CBO 16 supplies the command signals to decoder 46, which in turns supplies decoded signals over bus 250 to TC PLA 172 and to sequencing circuits of PLA 177, enumerated 251. Sequencing circuits 251 respond to a MODE SET command having an SC signal, such as in field 24, to supply a signal on line 252 enabling AND circuits 253 (see AO 211 of FIG. 5) for transferring control data signals, including the command, device address and other signals, over bus 254 to CAM 170. CBO 16 is logically connected to AND circuits 253 for supplying these signals, which are combined with the bus 250 signals for timing and control of AND circuits 253. Bus 250 also extends to PLA 172, which responds to the line 230 signal from SC flip flop 52 to activate encoder 236 to supply a UNIT CHECK signal to input-/output interface 14, as indicated by line 57 extending from TC 172 to encoder 236.

Upon receipt of a MODE SET command having a control byte 22-25 with SC 24 field equal to one, sequence circuits 251 supply a control signal over line 260 to CAM 170 at an address indicated by address signals on bus 188 to set a bit in register 261 corresponding to the device address contained in register 256; for example, if register 256 indicates device 7, then bit 7 of register 261 is set by the line 260 signal. In a practical embodiment involving programmed sequence circuits 251, the device address 256 would be decoded by the sequence circuits 251, the register 261 contents would be transferred to sequence circuits 251; then the bit position would be positioned and set in accordance with known data processing techniques. Alternatively, the contents of register 261 can be set via microprocessor 110 receiving the MODE SET control byte 22-25; the microprocessor 110 would have maintained an image of register 261 in its own control store 111. Then microprocessor 110 would supply the new byte to register 261 through external register 118, IC 171 over bus 210 to CAM 170. The address of register 261 would be generated and supplied over bus 188.

Whether or not a UNIT CHECK signal should be sent in response to a received supervisory command is determined by a channel adapter 80 sensing the contents of SC flip flop 52. SC flip flop 52 is set depending upon a signal state of the corresponding bit in register 261. The signal contents of 261 are accessed from CAM 170 using known addressing techniques under control of sequence circuits 251. The output signals on bus 199 are selected and manipulated such that an appropriate bit signal travels over line 262 for setting SC flip flop 52 to the active position only if a binary one is in the corresponding bit position of register 261. Line 265 extends from TC 172 for resetting SC flip flop 52 whenever chaining is stopped, as at 39 of FIG. 1. In other words, the SUPPRESS OUT line 20 is logically extended to TC 172 PLA and then transferred over line 265 to OR circuit 268 for resetting SC flip flop 52. Microprocessor 110 can reset SC flip flop 52, as during error recovery procedures, by supplying appropriate signals through external register 118 to IC 171. IC 171 responds to these signals for supplying a resetting signal over line 266 to OR circuit 268. Additional inputs to OR circuit 268 are indicated by arrow 269. Additionally microprocessor 110 sets SC flip flop 52 to the active condition by activating IC 171 to supply an active signal over line 267 to SC flip flop 52.

While the invention has been particularly shown and described with reference to preferred embodiments thereof, it will be understood by those skilled in the art that various changes in form and details may be made therein without departing from the spirit and scope of the invention.

What is claimed is:

1. A control for a peripheral device subsystem adapted to be attached to input/output channels of a host computer, said subsystem having first and second modes of operation, respectively, enabling and inhibiting a first predetermined function to be performed by the subsystem and additional modes of operation enabling second predetermined functions to be performed by said subsystem;

command means being coupled to said input/output channels for receiving command signals therefrom and for generating operation control signals for distribution in the subsystem to effect execution of functions indicated by said received command signals;

chaining means being coupled to said input/output channels for indicating that a series of said command signals relates to a given sequence of operations of said input/output channels;

the improvement comprising:

supervisory control means being coupled to said chaining means and to said command means for responding to and one of a plurality of predetermined ones of said received command signals to generate supervisory control signals, including a first supervisory control signal having first and second signal states, respectively, indicating said first and second modes of operation of said subsystem and second supervisory control signals indicating said additional modes of operation of said subsystem, in response to said predetermined ones of said received command signals anywhere in said series of command signals;

operation control means being coupled to said chaining means, to said command means and to said supervisory control means for responding to said operation control signals in accordance with said modes of operation of the subsystem indicated by said generated supervisory control signals including those second supervisory control signals generated by said supervisory control means in response to said any one-of-a-plurality of said predetermined ones of said received command signals received by said subsystem from said input/output channels during a series of commands other than and preceding the instant one of said series of commands for performing subsystem functions enabled by receipt of said received command signals; and inhibit means being coupled to said supervisory control means and said chaining means for responding to said first supervisory control signal to inhibit response of said supervisory control means to any subsequently received predetermined ones of said command signals for the remainder of said instant series of commands.

2. The control set forth in claim 1 further including means being coupled to said inhibit means and to said supervisory control means for responding to said inhibit means and to a received supervisory command while said inhibit means is inhibiting response of said supervisory control means to indicate an error condition resulting from an attempted operation other than an operation permitted by said indicated mode.

3. The control set forth in claims 1 or 2 wherein said control includes a plurality of channel adapter portions respectively for being connected to a one of said input/output channels, subsystem control portions in said control being coupled to all of the above-mentioned means for operating said peripheral device subsystem and being connected to said channel adapter portions for communication with the respective input/output channels.

4. The control set forth in claim 3 wherein each of said channel adapter portions includes a memory;
a plurality of addressable peripheral devices in said peripheral device subsystem being coupled to said channel adapter portions for communicating with said input/output channels;
each memory having a status portion for each of said devices including storage of said one supervisory control signal relating to the respective peripheral device;
device address means being coupled to said channel adapter portions, said supervisory control means and said operation control means for indicating which of said devices is being addressed in association with each received command signal; and
means in each of said storage adapter portions being coupled to said inhibit means, said memory in the respective channel adapter portion, and said supervisory control means for responding to a received command signal and device address to transfer the signal contents of said memory status portion to said inhibit means to determine acceptability of a received command signal.

5. The machine-implemented method of operating a peripheral subsystem, including the automatically executed steps of:
receiving commands from a host in a sequence of command chains, each chain being a sequence of commands;
identifying some of said received commands as received supervisory commands, which command predetermined modes of operation to be used in the peripheral subsystem and others of said received commands as received operation commands, which command predetermined peripheral functions to be performed in the peripheral subsystem;
in response to said received supervisory commands, altering internal modes operation of the peripheral subsystem; and in response to said received operation commands, executing the commanded peripheral functions;
accepting said received supervisory commands in any sequence within any of said chains of commands; in a given chain of commands, receiving a given supervisory command having a supervisory control bit;
examining said supervisory control bit to determine whether or not subsequently received supervisory commands within said given chain of commands are to be accepted; if so, accept such subsequently received supervisory commands within said given chain of commands; if not, within said given chain of commands only, rejecting all subsequent supervisory commands while executing operation commands subsequently received in said given chain of commands; and
for each rejected supervisory command indicating an error condition to the host that sent the rejected supervisory command.

6. A control unit in a peripheral device subsystem for controlling a plurality of peripheral devices connected to the control unit and adapted to be connected to input/output channels for receiving peripheral device-related commands having device addresses;
the improvement including in combination:
command execution control means being coupled to said peripheral devices and to said input/output channels for responding to commands received from said input/output channels for effecting a peripheral operation including predetermined peripheral operations in said peripheral devices;
supervisory means in said command execution control means coupled to said input/output channels for responding to predetermined ones of said received commands to indicate alterations in operations of said subsystem with respect to respective ones of said peripheral devices addressed by said predetermined ones of said received commands;
inhibit means in said command execution control means and being coupled to said supervisory means and to said input/output channels for responding to a given one of said received commands to selectively inhibit said supervisory means from altering subsystem operations performable with respect to respective ones of said peripheral devices;
penultimate means being coupled to said input/output channels for responding to receipt of a SUPPRESS OUT signal at the termination of each command execution by said command execution control means to maintain said inhibit for a next-received command for said respective device; and
last means coupling said penultimate means, said command execution control means, said supervisory control means, and said inhibit means to said input/output channels.

7. The control unit set forth in claim 6 further including memory means for memorizing said inhibits for each of said devices whereby said control unit can interleave device operations irrespective of said inhibits for all of said devices and means coupling said memory means to said inhibit means.

8. The control set forth in claims 1, 2 or 4 further including:
reset means in said chaining means for indicating a cessation of said given sequence of operations; and
means connected to said reset means and responsive to said cessation indication to reset said inhibit means.

* * * * *